United States Patent [19]

Okimura et al.

[11] Patent Number: 5,416,165
[45] Date of Patent: May 16, 1995

[54] CURABLE COMPOSITION FOR PAINT

[75] Inventors: Yoshihiko Okimura, Takasago; Masaharu Inoue, Kobe; Hirotoshi Kawaguchi, Kobe; Hisao Furukawa, Kobe, all of Japan

[73] Assignee: Kanegafuchi Kagaku Kogyo Kabushiki Kaisha, Osaka, Japan

[21] Appl. No.: 138,444

[22] Filed: Oct. 20, 1993

[30] Foreign Application Priority Data

Oct. 23, 1992 [JP] Japan .................................. 4-286139

[51] Int. Cl.$^6$ .............................................. C08L 43/04
[52] U.S. Cl. ...................................... 525/209; 525/100
[58] Field of Search ................................ 525/100, 209

[56] References Cited

U.S. PATENT DOCUMENTS

| | | | |
|---|---|---|---|
| 4,975,488 | 12/1990 | Furukawa et al. | 525/100 |
| 5,281,636 | 1/1994 | Nambu et al. | 524/378 |
| 5,284,919 | 2/1994 | Nakai | 525/195 |

FOREIGN PATENT DOCUMENTS

| | | |
|---|---|---|
| 0318880A2 | 6/1989 | European Pat. Off. . |
| 0427293A1 | 5/1991 | European Pat. Off. . |
| 0484540A1 | 5/1992 | European Pat. Off. . |
| 2-169651 | 6/1990 | Japan . |

*Primary Examiner*—Ralph H. Dean
*Attorney, Agent, or Firm*—Armstrong, Westerman, Hattori, McLeland & Naughton

[57] ABSTRACT

A curable composition for paint containing:

(A) 95 to 5 parts by weight of a vinyl copolymer having at least one specific hydrolyzable silyl group and at least one specific alcoholic hydroxyl group existing at an end of the main chain and/or in a side chain thereof in one molecule, in which the main chain contains substantially a vinyl copolymer chain and the alcoholic hydroxyl equivalent is from 180 to 2000 g/mol;

(B) 5 to 95 parts by weight of a vinyl copolymer having at least one specific hydrolyzable silyl group at an end of the main chain and/or in a side chain thereof in one molecule and having no alcoholic hydroxyl group in the same molecule, in which the main chain contains substantially a vinyl copolymer chain; and (C) 0.001 to 10 parts by weight of a curing catalyst per 100 parts by weight of the total resin solids content.

This curable composition for paint has well-balanced properties of good acid resistance, water resistance, scratch resistance, weathering resistance, and so forth.

4 Claims, No Drawings

CURABLE COMPOSITION FOR PAINT

BACKGROUND OF THE INVENTION

The present invention relates to a curable composition for paint which has excellent acid resistance, water resistance, scratch resistance and weathering resistance. More particularly the invention relates to a curable composition suitable for use as a paint for top coatings of automobiles, industrial machines, steel furniture, outer walls of buildings, household electric appliances, plastics, and the like.

Up to the present time, resins for paint used for coating automobiles, outer walls of buildings, industrial machines, steel furniture, plastics and the like, have been mainly melamine resins such as alkyd melamine and acrylic melamine.

However, these melamine resins have problems in that noxious formalin is generated during the curing process and that the cured films are damaged by acid rain as a result of their poor acid resistance. In particular, the problems of acid rain resulting from air pollution have become serious recently, with the occurrence of etching, blushing and stains being observed.

In order to solve these kinds of problems, the present inventors had investigated the use of a vinyl copolymer having a silicon atom to which a hydrolyzable group is bonded (hereinafter also referred to as "hydrolyzable silyl group"), or a blend system thereof with an acrylic polyol, for paint. As a result, it was found that this kind of copolymer or blend system can solve the above-mentioned problems and can give a curable composition for paint which has excellent acid resistance and weathering resistance, as described in prior patent applications (see, for example, Japanese Unexamined Patent Publication (Tokkyo Kokai) No. 132977/1988 and the like).

The above-mentioned vinyl copolymer having a hydrolyzable silyl group, and the blend system thereof with an acrylic polyol, have superior acid resistance and weathering resistance compared to melamine resins such as acrylic melamine and alkyd melamine. This is because their silyl group and alcoholic hydroxyl group form a stable siloxane bond or siloxy bond to cure the copolymer or blend system.

The hydrolyzable silyl group shown by the formula (I):

(wherein $R^1$ is an alkyl group having from 1 to 10 carbon atoms; $R^2$ is a hydrogen atom or a monovalent hydrocarbon group selected from an alkyl group, an aryl group and an aralkyl group each having 1 to 10 carbon atoms; and a is 0, 1 or 2) is incorporated into the main chain of the copolymer through a Si—C bond. As a result, copolymers having this kind of hydrolyzable silyl group have excellent acid resistance and weathering resistance.

In comparison to the system which does not have an acrylic polyol, the blend system of a vinyl copolymer having a hydrolyzable silyl group with an acrylic polyol has both superior heat-curability and appearance. In addition, there is the further advantage that the amount of the compound having a hydrolyzable silyl group, which is a relatively expensive raw material, can be reduced, leading to the production of a curable composition at low cost. However, the blend system has a disadvantage in that it has a somewhat inferior water resistance and acid resistance. Furthermore, in the blend system, improvement in the compatibility of the vinyl copolymer having a hydrolyzable silyl group with the acrylic polyol is necessary, so that the molecular weight of each resin, the composition of the copolymerizable compounds and the blending ratio are restricted.

The present invention has been realized in consideration of these kinds of problems inherent in the prior art, and accordingly, an object of this invention is to provide a curable composition for paint having excellent heat-curability, appearance, acid resistance and water resistance, and which is produced at low cost.

SUMMARY OF THE INVENTION

In accomplishing the foregoing and related objects, the present invention provides a curable composition for paint comprising:

(A) 95 to 5 parts by weight of a vinyl copolymer having at least one hydrolyzable silyl group represented by the formula (I):

(wherein $R^1$ is an alkyl group having from 1 to 10 carbon atoms; $R^2$ is a hydrogen atom or a monovalent hydrocarbon group selected from an alkyl group, an aryl group and an aralkyl group each having from 1 to 10 carbon atoms; and a is 0, 1 or 2) bonded at an end of the main chain and/or in a side chain thereof in one molecule, and having an alcoholic hydroxyl group at an end of the main chain and/or in a side chain thereof in the same molecule, wherein the main chain comprises substantially a vinyl copolymer chain and the alcoholic hydroxyl equivalent is from 180 to 2000 g/mol;

(B) 5 to 95 parts by weight of a vinyl copolymer having at least one hydrolyzable silyl group represented by the formula (II):

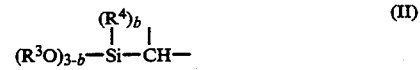

(wherein $R^3$ is an alkyl group having from 1 to 10 carbon atoms; $R^4$ is a hydrogen atom or a monovalent hydrocarbon group selected from an alkyl group, an aryl group and an aralkyl group each having from 1 to 10 carbon atoms; and b is 0, 1 or 2) at an end of the main chain and/or in a side chain thereof in one molecule, and having no alcoholic hydroxyl group in the same molecule, wherein the main chain comprises substantially a vinyl copolymer chain; and (C) 0.001 to 10 parts by weight of a curing catalyst per 100 parts by weight of the total amount of the components (A) and (B).

In the formulae (I) and (II), the silicon atom bonding to the hydrolyzable group bonds to the main chain of the vinyl copolymer through a Si-C bond. As a result, both the vinyl copolymers (A) and (B) exhibit excellent acid resistance and weathering resistance.

Furthermore, in the blend system of the above-mentioned vinyl copolymers (A) and (B), the alcoholic hydroxyl group is incorporated into the same molecule which has the hydrolyzable silyl group. Accordingly, this blend system has superior acid resistance and water resistance compared to the blend system of an acrylic polyol with a vinyl copolymer having a hydrolyzable silyl group and no alcoholic hydroxyl group.

These and other aspects and advantages of the present invention will become better understood with regard to the following description and appended claims.

DETAILED DESCRIPTION OF THE PREFERRED EMBODIMENTS

The component used as the component (A) in the present invention is a vinyl copolymer having at least one hydrolyzable silyl group represented by the formula (I):

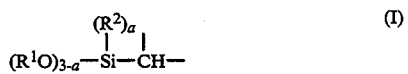

(wherein $R^1$ is an alkyl group having from 1 to 10 carbon atoms; $R^2$ is a hydrogen atom or a monovalent hydrocarbon group selected from an alkyl group, an aryl group and an aralkyl group each having from 1 to 10 carbon atoms; and a is 0, 1 or 2) at an end of the main chain and/or in a side chain thereof in one molecule, and having at least one alcoholic hydroxyl group at an end of the main chain and/or in a side chain thereof in the same molecule, wherein the main chain comprises substantially a vinyl copolymer chain and the alcoholic hydroxyl equivalent is from 180 to 2000 g/mol.

The component used as the component (B) in the present invention is a vinyl copolymer having at least one hydrolyzable silyl group represented by the formula (II):

(wherein $R^3$ is an alkyl group having from 1 to 10 carbon atoms; $R^4$ is a hydrogen atom or a-monovalent hydrocarbon group selected from an alkyl group, an aryl group and an aralkyl group each having from 1 to 10 carbon atoms; and b is 0, 1 or 2) at an end of the main chain and/or in a side chain thereof in one molecule, and having no alcoholic hydroxyl group in the same molecule, wherein the main chain comprises substantially a vinyl copolymer chain.

The content of the alcoholic hydroxyl groups in the above-mentioned vinyl copolymer (A) is preferably within the range of from 180 to 2000 g/mol by alcoholic hydroxyl equivalent.

The content of the hydrolyzable silyl groups in the above-mentioned vinyl copolymer (A) is preferably from 380 to 30000 g/mol, more preferably from 410 to 3000 g/mol, and most preferably from 450 to 1500 g/mol by hydrolyzable silyl equivalent, from the viewpoints of heat-curability, acid resistance and weathering resistance.

The ratio of the hydrolyzable silyl groups and the alcoholic hydroxyl groups, is preferably from 0.1 to 3.0 alcoholic hydroxyl groups per hydrolyzable silyl group, from the viewpoints of heat-curability, acid resistance, weathering resistance and water resistance.

The molecular weight of the above-mentioned vinyl copolymer (A) having a hydrolyzable silyl group and an alcoholic hydroxyl group is preferably from 1000 to 30000, and more preferably from 2000 to 25000, from the viewpoint of the physical properties of the coating film of the curable composition for paint of the present invention, which is produced by using the vinyl copolymer (A).

The vinyl copolymer (A) is generally composed of units having a hydrolyzable silyl group, units having an alcoholic hydroxyl group, units which are copolymerizable with monomers which contain the aforesaid units, and the like.

The above-mentioned unit having a hydrolyzable silyl group can be formed, for example, by polymerizing a vinyl-based copolymerizable compound containing an alkoxy silyl group. Examples of vinyl-based copolymerizable compounds containing an alkoxy silyl group include the following:

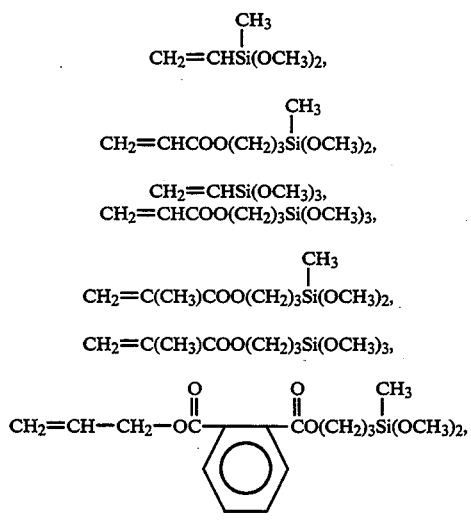

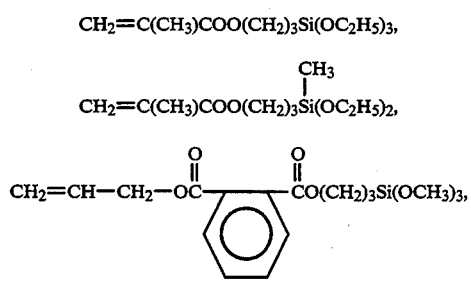

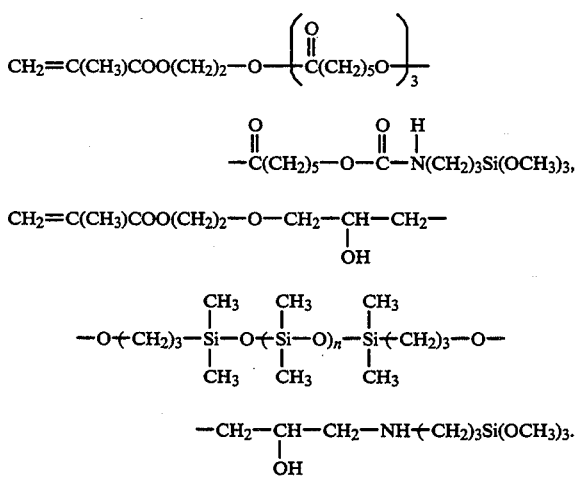

In addition, (meth)acrylates (the term means both acrylate and methacrylate, hereinafter the same) having an alkoxy silyl group at the end thereof through a urethane bond or a siloxane bond can also be included. These vinyl-based copolymerizable compounds containing an alkoxy silyl group may be used alone or, if necessary, as a mixture of two or more thereof.

The above-mentioned unit having an alcoholic hydroxyl group can be formed, for example, by polymerizing a vinyl-based copolymerizable compound containing an alcoholic hydroxyl group. Typical examples of vinyl-based copolymerizable compounds containing an alcoholic hydroxyl group include 2-hydroxyethyl (meth)acrylate, 1-hydroxypropyl (meth)acrylate, 2-hydroxypropyl (meth)acrylate, 2-hydroxyethyl vinyl ether, N-methylol (meth)acrylamide, "Aronix 5700" (which is commercially available from Toagosei Chemical Industry Co., Ltd.), 4-hydroxystyrene, "HE-10", "HE-20", "HP-1" and "HP-20" (which are commercially available from Nippon Shokubai Co., Ltd.) (the compounds listed above are acrylate oligomers having a hydroxyl group at the oligomer end), "Blenmer PP series" (polypropylene glycol methacrylates), "Blenmer PE series" (polyethylene glycol monomethacrylates), "Blenmer PEP series" (polyethylene glycol polypropylene glycol methacrylates), "Blenmer AP-400" (polypropylene glycol monoacrylate), "Blenmer AE-350" (polyethylene glycol monoacrylate), "Blenmer NKH-5050" (polypropylene glycol polytrimethylenemonoacrylate), "Blenmer GLM" (glycerol monomethacrylate) (these "Blenmer series" compounds are commercially available from NOF CORPORATION), ε-caprolactone-modified hydroxyalkyl vinyl-based copolymerizable compounds obtained by the reaction of a hydroxyl group-containing vinyl compound with ε-caprolactone, and the like. Among these, 2-hydroxypropyl acrylate is especially preferable since it can impart excellent acid resistance and water resistance to the coating film.

Typical examples of the ε-caprolactone-modified hydroxyalkyl vinyl-based copolymerizable compounds are compounds represented by the following formula (III):

$$\begin{array}{c} R \\ | \\ CH_2=C \\ | \\ COOCH_2CH_2O(CCH_2CH_2CH_2CH_2CH_2O)_{\overline{n}}H \end{array} \quad (III)$$

wherein R is a hydrogen atom or a methyl group and n is an integer of not less than 1. Examples of such compounds include "Placcel FA-1" (R=H, n=1), "Placcel FA-4" (R=H, n=4), "Placcel FM-1" (R=CH₃, n=1), "Placcel FM-4" (R=CH₃, n=4) (which are commercially available from DAICEL CHEMICAL INDUSTRIES, LTD.), "TONE M-100" (R=H, n=2), "TONE M-201" (R=CH₃, n=1) (which are commercially available from UCC Kabushiki Kaisha), and the like. These alcoholic hydroxyl group-containing vinyl-based copolymerizable compounds may be used alone or, if necessary, as a mixture of two or more thereof.

Typical examples of the unit having a hydrolyzable silyl group, the unit having an alcoholic hydroxyl group and the unit obtained by polymerizing a monomer copolymerizable with a monomer of these units are (meth)acrylic acid derivatives. Examples of these (meth)acrylic acid derivatives are a phosphate group-containing vinyl compound which is a condensation product of a hydroxyalkyl ester of α,β-ethylenically unsaturated carboxylic acid with phosphoric acid or a phosphoric ester, a (meth)acrylate containing a urethane bond or a siloxane bond, and the like, including methyl (meth)acrylate, ethyl (meth)acrylate, n-butyl (meth)acrylate, isobutyl (meth)acrylate, 2-ethylhexyl (meth)acrylate, stearyl (meth)acrylate, benzyl (meth)acrylate, cyclohexyl (meth)acrylate, trifluoroethyl (meth)acrylate, pentafluoropropyl (meth)acrylate, perfluorocyclohexyl (meth)acrylate, (meth)acrylonitrile, glycidyl (meth)acrylate, dimethylaminoethyl (meth)acrylate, diethylaminoethyl (meth)acrylate, (meth)acrylamide, α-ethyl (meth)acrylamide, N-butoxymethyl (meth)acrylamide, N,N-dimethyl (meth)acrylamide, N-methyl acrylamide, "AS-6", "AN-6", "AA-6", "AB-6", "AK-5" (which are macromonomers commercially available from Toagosei Chemical Industry Co., Ltd.), a hydroxyalkyl ester of (meth)acrylic acid, and the like.

Typical examples of the copolymerizable compound other than the (meth)acrylic acid derivatives mentioned above are aromatic hydrocarbon-based vinyl compounds such as styrene, α-methylstyrene, chlorostyrene, styrenesulfonic acid, 4-hydroxystyrene and vinyl toluene; unsaturated carboxylic acids such as maleic acid, fumaric acid and itaconic acid; salts thereof (alkali metal salts, ammonium salts, amine salts or the like), anhydrides thereof (maleic anhydride, or the like), or esters (including diesters or half esters) thereof with an alcohol having a linear or branched chain of from 1 to 20 carbon atoms; vinyl esters such as vinyl acetate and vinyl propionate, and allyl compounds such as diallyl phthalate; amino group-containing vinyl compounds such as vinylpyridine and aminoethyl vinyl ether; amide group-containing vinyl compounds such as itaconic acid diamide, crotonamide, maleic acid diamide, fumaric acid diamide and N-vinylpyrrolidone; other vinyl compounds such as 2-hydroxyethyl vinyl ether, methyl vinyl ether, cyclohexyl vinyl ether, vinyl chloride, vinylidene chloride, chloroprene, propylene, butadiene, isoprene, fluoroolefin maleimide, N-vinylimidazole and vinylsulfonic acid; and the like.

Among the copolymerizable (meth)acrylic acid derivatives and the copolymerizable compounds other than the (meth)acrylic acid derivatives mentioned above, when a polar copolymerizable compound having an amine-, carboxylic acid-, sulfonic acid- or phosphoric acid-based group is used, it is desirable to employ an amount of the compound in the component (A) of from 0 to 5% ("%" means % by weight; hereinafter the same) in order to depress cross-linking reactions during polymerization.

The component (A) may contain a segment formed by a urethane bond or a siloxane bond in its main chain, as long as the amount is not more than 50%. This segment may be derived from copolymerizable compounds other than (meth)acrylic acid derivatives.

The molecular weight of the vinyl copolymer (B) is preferably from 1000 to 30000, and more preferably from 2000 to 25000, from the viewpoint of the physical properties of the coating film of the curable composition for paint of the present invention, which is produced by using the vinyl copolymer (B).

Examples of units constituting the above-mentioned vinyl copolymer (B) are a unit having a hydrolyzable silyl group and a unit of a monomer copolymerizable with a monomer which contains this unit.

The above-mentioned unit having a hydrolyzable silyl group can be formed, for example, by polymerizing an alkoxy silyl group-containing vinyl-based copolymerizable compound, examples of which are as follows:

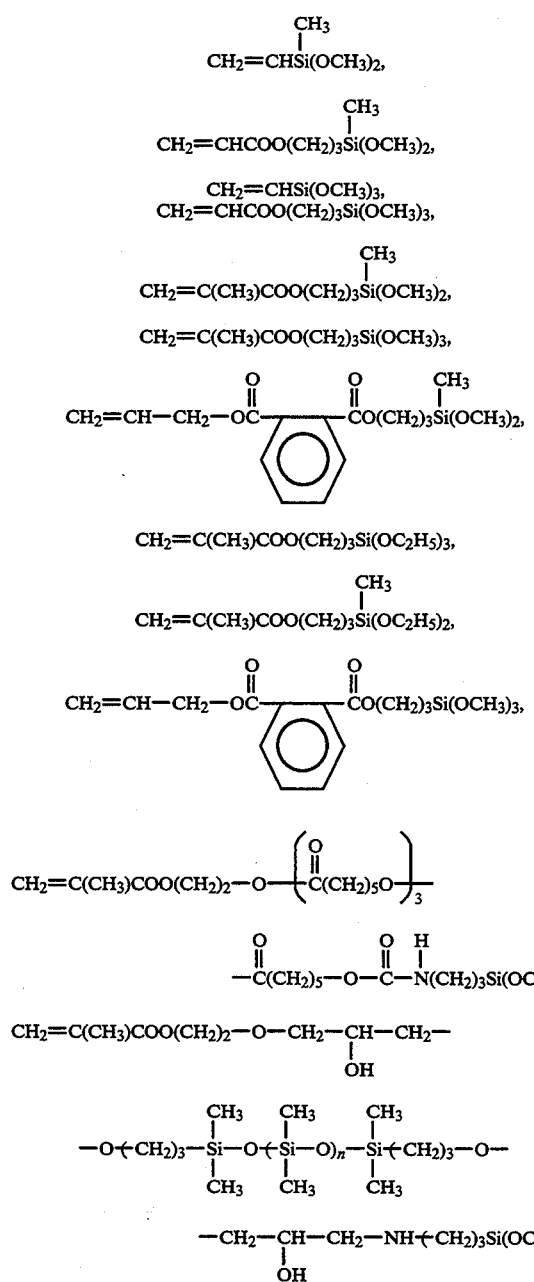

In addition, (meth)acrylates having an alkoxy silyl group at the end thereof through a urethane bond or a siloxane bond can also be used. These alkoxy silyl group-containing vinyl-based copolymerizable compounds may be used alone or, if necessary, as a mixture of two or more thereof.

Typical examples of the unit having a hydrolyzable silyl group and the unit obtained by polymerizing a monomer copolymerizable with a monomer of the unit mentioned above are vinyl-based copolymerizable compounds other than alcoholic hydroxyl group-containing vinyl-based copolymerizable compounds. Examples of the (meth)acrylic acid derivative in the vinyl-based copolymerizable compound mentioned above are a phosphate group-containing vinyl compound which is a condensation product of a hydroxyalkyl ester of α,β- ethylenically unsaturated carboxylic acid with phosphoric acid or a phosphoric ester, a (meth)acrylate containing a urethane bond or a siloxane bond, including methyl (meth)acrylate, ethyl (meth)acrylate, n-butyl (meth)acrylate, isobutyl (meth)acrylate, 2-ethylhexyl (meth)acrylate, stearyl (meth) acrylate, benzyl (meth) acrylate, cyclohexyl (meth) acrylate, trifluoroethyl (meth)acrylate, pentafluoropropyl (meth)acrylate, perfluorocyclohexyl (meth)acrylate, (meth)acrylonitrile, glycidyl (meth)acrylate, dimethylaminoethyl (meth) acrylate, diethylaminoethyl (meth)acrylate, (meth)acrylamide, α-ethyl (meth)acrylamide, N-butoxymethyl (meth) acrylamide, N,N-dimethyl (meth)acrylamide, N-methyl acrylamide, "AS-6", "AN-6", "AA-6", "AB-6", "AK-5" (which are macromonomers commercially-available from Toagosei Chemical Industry Co., Ltd.), a hydroxyalkyl ester of (meth)acrylic acid, and the like. Typical examples of the copolymerizable compounds other than the (meth)acrylic acid derivatives mentioned above include aromatic hydrocarbon-based vinyl compounds such as styrene, α-methylstyrene, chlorostyrene, styrenesulfonic acid, 4-hydroxystyrene and vinyl toluene; unsaturated carboxylic acids such as maleic acid, fumaric acid and itaconic acid, salts thereof (alkali metal salts, ammonium salts, amine salts or the like), anhydrides thereof (maleic anhydride or the like), or esters thereof (including diesters or half esters of the above unsaturated carboxylic acid or anhydride) with an alcohol having a linear or branched chain of from 1 to 20 carbon atoms; vinyl esters such as vinyl acetate or vinyl propionate and allyl compounds such as diallyl phthalate; amino group-containing vinyl compounds such as vinylpyridine and aminoethyl vinyl ether; amide group-containing vinyl compounds such as itaconic acid diamide, crotonamide, maleic acid diamide, fumaric acid diamide and N-vinylpyrrolidone; other vinyl compounds such as methyl vinyl ether, cyclohexyl vinyl ether, vinyl chloride, vinylidene chloride, chloroprene, propylene, butadiene, isoprene, fluoroolefin maleimide, N-vinylimidazole and vinylsulfonic acid; and the like.

The vinyl copolymer (A) containing both a hydrolyzable silyl group and an alcoholic hydroxyl group and the vinyl copolymer (B) containing a hydrolyzable silyl group and no alcoholic hydroxyl group can be prepared from the monomers providing the units mentioned above according to processes described in Japanese Unexamined Patent Publication (Tokkyo Kokai) Nos. 36395/1979, 36109/1982, 157810/1983, and the like. Most preferably, they are prepared by a solution polymerization method using an azo-based radical polymerization initiator such as azobisisobutyronitrile, from the viewpoint of easy synthetic handling, and so forth.

If necessary, a chain transfer agent may be used in the polymerization to control the molecular weight. Examples of the chain transfer agents include n-dodecyl mercaptan, tert-dodecyl mercaptan, n-butyl mercaptan, γ-mercaptopropyltrimethoxysilane, γ-mercaptopropyltriethoxysilane, γ-mercaptopropylmethyl-dimethoxysilane, γ-mercaptopropylmethyldiethoxysilane, $(CH_3O)_3Si-S-S-Si(OCH_3)_3$, and the like. Among these, chain transfer agents whose molecules contain an alkoxy silyl group, such as γ-mercaptopropyl-trimethoxysilane, are preferably used, since the alkoxy silyl group is introduced at the end of the silyl group-containing acrylic copolymer.

The polymerization solvents used in the above-mentioned solution polymerization are non-reactive solvents, examples of which include hydrocarbons such as toluene, xylene, n-hexane and cyclohexane; acetates such as ethyl acetate and butyl acetate; alcohols such as methanol, ethanol, isopropanol and n-butanol; ethers such as ethyl cellosolve, butyl cellosolve and cellosolve acetate; ketones such as methyl ethyl ketone, ethyl acetoacetate, acetylacetone, diacetone alcohol, methyl isobutyl ketone and acetone; and the like.

The polymerization solvents may be used alone or as a mixture of two or more thereof. In particular, in the polymerization of the vinyl copolymer (A), when the amount of alcoholic solvent such as methanol or butanol in the solvent composition is less than 1 part per 100 parts of the total amount of the copolymerizable compound constituting the vinyl copolymer, there is a possibility of gelation. Therefore, it is preferable that the solvent used in the polymerization of the vinyl copolymer (A) contains an alcoholic solvent, preferably in an amount of from 1 to 30 parts per 100, parts of the total amount of the copolymerizable compounds constituting the vinyl copolymer.

Examples of the curing catalyst used as the component (C) in the present invention are organotin compounds such as dibutyl tin dilaurate, dibutyl tin dimaleate, dioctyl tin dilaurate, dioctyl tin dimaleate and tin octate; phosphoric acid or a phosphoric ester such as phosphoric acid, monomethyl phosphate, monoethyl phosphate, monobutyl phosphate, monooctyl phosphate, monodecyl phosphate, dimethyl phosphate, diethyl phosphate, dibutyl phosphate, dioctyl phosphate and didecyl phosphate; addition reaction products of phosphoric acid and/or a monophosphate with an epoxy compound, such as propylene oxide, butylene oxide, cyclohexene oxide, glycidyl methacrylate, glycidol, acryl glycidyl ether, γ-glycidoxypropyltrimethoxysilane, γ-glycidoxypropyltriethoxysilane, γ-glycidoxypropylmethyldimethoxysilane,

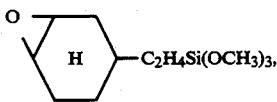

"Cardula E", "Epicoat 828" and "Epicoat 1001" (which are commercially available from Yuka Shell Epoxy Kabushiki Kaisha); organic titanate compounds; organic aluminum compounds; maleic acid, adipic acid, azelaic acid, sebacic acid, itaconic acid, citric acid, succinic acid, phthalic acid, trimellitic acid, pyromellitic acid, or an anhydride thereof; acidic compounds such as dodecylbenzenesulfonic acid, para-toluenesulfonic acid, or a reactant thereof with an amine; amines such as hexylamine, di-2-ethylhexylamine, N,N-dimethyldodecylamine, dodecylamine, DABCO, DBU, morpholine and diisopropanolamine; reaction products of the above-mentioned amines with acid phosphates; alkaline compounds such as sodium hydroxide and potassium hydroxide; and the like. These curing catalysts may be used alone or as a mixture of two or more thereof.

Among the above-mentioned curing catalysts, organotin compounds, acid phosphates, reaction products of acid phosphates with amines, saturated or unsaturated polyhydric carboxylic acids or their anhydrides, sulfonic acids or their reaction products with amines, organic titanate compounds, organic aluminum compounds, or a mixture thereof, are preferably used because of their high activities.

In the blending ratio of the components (A) and (B), the component (A) is from 95 to 5 parts, preferably from 90 to 50 parts, and more preferably from 85 to 65 parts per 5 to 95 parts, preferably 10 to 50 parts, and more preferably 15 to 35 parts of the component (B). When the ratio of the components (A) and (B) is within the aforesaid ranges, the resulting cured product exhibits good gel fraction retention, water-resistant gel fraction retention, acid resistance, scratch resistance, and so forth, wherein such properties are well-balanced. Therefore, this kind of condition is preferable.

The amount of the above-mentioned component (C) is from 0.001 to 10 parts, and preferably from 0.05 to 10 parts per 100 parts of the total of the components (A) and (B). When the amount of the component (C) is less than 0.01 part, the curability tends to be lowered, and when the amount is more than 10 parts, the appearance of the film tends to be deteriorated.

In order to further lower the viscosity, the composition of the present invention may contain an organopolysiloxanesilanol, a tetra-alkoxysilane, an alkyltrialkoxysilane or a partially hydrolyzed product thereof, an amino resin such as melamine, or the like, in an amount preferably not more than 50 parts, and more preferably not more than 30 parts per 100 parts of the total of the components (A) and (B).

The composition of the present invention may contain a hydroxyl group-containing polymeric compound such as acrylic polyol, polycarbonate diol and polyester diol, as long as the ratio of the number of alcoholic hydroxyl groups and the number of hydrolyzable silyl groups is within the range of from 0.1/1 to 3.0/1.

The composition of the present invention may contain a hydrolyzable ester compound as a dehydrating agent and an alkyl alcohol as a solvent.

Examples of the dehydrating agent include ester compounds such as methyl orthoformate, ethyl orthoformate, methyl orthoacetate, ethyl orthoacetate, ethyl silicate and methyl silicate; hydrolyzable ester compounds such as methyltrimethoxysilane; and the like.

These dehydrating agents may be added either during or after polymerization. The amount of the dehydrating agent is not more than 70 parts, preferably not more than 50 parts, and more preferably not more than 20 parts per 100 parts of the total of the components (A) and (B).

The alkyl alcohol to be used as a solvent is exemplified by an alcohol having an alkyl group of from 1 to 10 carbon atoms. Examples of such alcohols include methyl alcohol, ethyl alcohol, n-propyl alcohol, isopropyl alcohol, n-butyl alcohol, isobutyl alcohol, sec-butyl alcohol, tert-butyl alcohol, n-amyl alcohol, isoamyl alcohol, hexyl alcohol, octyl alcohol, cellosolve, and the like.

The amount of the above-mentioned alcohol used is not particularly limited, but is usually not more than 70 parts, preferably not more than 50 parts, and more preferably not more than 20 parts per 100 parts of the total of the components (A) and (B). When the solvent is used alone without a dehydrating agent, the amount is usually from 0.5 to 70 parts, preferably from 1 to 50 parts, and more preferably from 2 to 20 parts per 100 parts of the total of the components (A) and (B).

When the alcohol and the dehydrating agent are used together, the storage stability of the resulting composition is remarkably improved compared to that of a composition consisting only of the components (A), (B) and (C). The amount of the solvent which gives this kind of effect cannot be fixed absolutely because the amount varies according to the molecular weights and compositions of the components (A), (B) and (C). The amount may be adjusted so that the resultant composition has the practically desired solid content, viscosity, and so forth.

When the composition of the present invention is used for a top coat, the weathering resistance can be further, improved by blending an ultraviolet absorber or a photostabilizing agent, and especially by blending both of these together.

As the above-mentioned ultraviolet absorber, conventionally known absorbers can be widely used. For example, benzophenone-based, triazole-based, phenyl salicylate-based, diphenylacrylate-based, acetophenone-based ultraviolet absorbers and the like are preferable.

As the above-mentioned photostabilizing agent, conventionally known agents can be widely used. For example, bis(2,2,6,6-tetramethyl-4-piperidyl)sebacate, bis(1,2,2,6,6-pentamethyl-4-piperidyl)sebacate, bis(1,2,2,6,6-pentamethyl-4-piperidyl)2-(3,5-di-tert-butyl-4-hydroxybenzyl)-2-n-butylmalonate, tetrakis(2,2,6,6-tetramethyl-4-piperidyl)1,2,3,4-butanetetracarboxylate, tetrakis(1,2,2,6,6-pentamethyl-4-piperidyl)-1,2,3,4-butanetetracarboxylate, and the like, can be employed. The photostabilizing agents may be used alone or as a mixture of two or more thereof.

The amount of the ultraviolet absorber is usually from 0.1 to 10 parts, and preferably from 1 to 5 parts per 100 parts of the the solid matter in the composition.

The amount of the photostabilizing agent is usually from 0.1 to 10 parts, and preferably from 1 to 5 parts per 100 parts of the solid matter in the composition.

When the composition of the present invention is used for a top coat, there may be added, according to the intended uses thereof, various additives such as a diluent, an agent for preventing scissing and a leveling agent; a cellulose-based compound such as nitrocellulose and cellulose acetate butylate; a resin such as epoxy resin, melamine resin, vinyl chloride resin, chlorinated propylene resin, chlorinated rubber and polyvinyl butyral; or the like.

The composition of the present invention has low toxicity, and a high solid content of from 50 to 70% can be attained. For example, the composition can be applied to a substrate by a method such as spray coating, brush coating, dip coating, or the like, followed by curing by heating at about 80° C. to about 160° C. to give a cured coating film which has excellent chemical resistance such as acid resistance, weathering resistance, scratch resistance, and so forth.

The composition of the present invention is useful for coating various articles such as automobiles, outer walls of buildings, industrial machines, steel furniture, plastics, and so forth, and is especially useful as a paint for top coatings of automobiles.

Next, the present invention is more specifically described and explained by means of the following Examples in which all % and parts are by weight unless otherwise noted. It is to be understood that the present invention is not limited to the Examples, and various changes and modifications may be made in the present invention without departing from the spirit and scope thereof.

SYNTHESIS EXAMPLE 1

Synthesis of a vinyl copolymer (A-1) containing a hydrolyzable silyl group and an alcoholic hydroxyl group A reactor equipped with a stirrer, a thermometer, a reflux condenser, a nitrogen gas inlet tube and a dropping funnel was charged with 26.0 parts of "Solvesso 100" (a petrolic aromatic solvent, produced by Exxon Chemical Japan, Ltd.), and the reactor was heated to 110° C. while introducing nitrogen gas. Subsequently, the mixture shown below was added dropwise to the reactor through the dropping funnel at a uniform rate over a period of 3 hours.

| | |
|---|---|
| Styrene | 15.0 parts |
| Methyl methacrylate | 8.3 parts |
| n-Butyl acrylate | 34.3 parts |
| 2-Hydroxypropyl acrylate | 22.4 parts |
| γ-Methacryloxypropyltrimethoxysilane | 20.0 parts |
| 2,2'-Azobis(2-methyl)butyronitrile (V-59: produced by Wako Pure Chemical Industries, Ltd.) | 6.46 parts |
| Methyl orthoacetate | 2.0 parts |
| Solvesso 100 | 3.5 parts |
| Methanol | 2.0 parts |

After completing the addition of the mixture, 0.34 part of V-59, 5.0 parts of Solvesso 100, 2.0 parts of methyl orthoacetate and 10.0 parts of xylene were added dropwise to the reactor at a uniform rate over a period of 30 minutes. After carrying out polymerization for one and a half hours, the reactor was cooled, and then 4.0 parts of methyl orthoacetate and 4.0 parts of methanol were added thereto. Subsequently, Solvesso 100 was further added to adjust the solids content to 60%. As the product, a solution of a vinyl copolymer (A-1) containing a hydrolyzable silyl group and an alcoholic hydroxyl group was obtained.

The number average molecular weight of the obtained vinyl copolymer (A-1) was found to be 4000. The hydroxyl equivalent and the silyl equivalent of the vinyl copolymer (A-1) were 580 and 1240, respectively.

SYNTHESIS EXAMPLE 2

Synthesis of a vinyl copolymer (A-2) containing a hydrolyzable silyl group and an alcoholic hydroxyl group A similar procedure as in Synthesis Example 1 was carried out except that the mixture shown below was used as the mixture of copolymerizable compounds.

| | |
|---|---|
| Styrene | 15.0 parts |
| Methyl methacrylate | 0.1 part |
| n-Butyl acrylate | 42.5 parts |
| 2-Hydroxyethyl methacrylate | 22.4 parts |
| γ-Methacryloxypropyltrimethoxysilane | 20.0 parts |

The solids content of the obtained solution of a vinyl copolymer (A-2) containing a hydrolyzable silyl group and an alcoholic hydroxyl group was 60%. The number average molecular weight of the obtained vinyl copolymer (A-2) was found to be 3900. The hydroxyl equivalent and the silyl equivalent of the vinyl copolymer (A-2) were 580 and 1240, respectively.

SYNTHESIS EXAMPLE 3

Synthesis of a vinyl copolymer (A-3) containing a hydrolyzable silyl group and an alcoholic hydroxyl group A similar procedure as in Synthesis Example 1 was carried out except that the mixture shown below was used as the mixture of copolymerizable compounds.

| | |
|---|---|
| Styrene | 15.0 parts |
| Methyl methacrylate | 10.6 parts |
| n-Butyl acrylate | 34.4 parts |
| 2-Hydroxyethyl acrylate | 20.0 parts |
| γ-Methacryloxypropyltrimethoxysilane | 20.0 parts |

The solids content of the obtained solution of a vinyl copolymer (A-3) containing a hydrolyzable silyl group and an alcoholic hydroxyl group was 60%. The number average molecular weight of the obtained vinyl copolymer (A-3) was found to be 3900. The hydroxyl equivalent and the silyl equivalent of the vinyl copolymer (A-3) were 580 and 1240, respectively.

SYNTHESIS EXAMPLE 4

Synthesis of a vinyl copolymer (A-4) containing a hydrolyzable silyl group and an alcoholic hydroxyl group A similar procedure as in Synthesis Example 1 was carried out except that the mixture shown below was used as the mixture of copolymerizable compounds.

| | |
|---|---|
| Styrene | 15.0 parts |
| Methyl methacrylate | 7.9 parts |
| n-Butyl acrylate | 18.0 parts |
| Placcel FA-1 (produced by DAICEL CHEMICAL INDUSTRIES, LTD.) | 39.1 parts |
| γ-Methacryloxypropyltrimethoxysilane | 20.0 parts |

The solids content of the obtained solution of a vinyl copolymer (A-4) containing a hydrolyzable silyl group and an alcoholic hydroxyl group was 60%. The number average molecular weight of the obtained vinyl copolymer (A-4) was 4300. The hydroxyl equivalent and the silyl equivalent of the vinyl copolymer (A-4) were 624 and 1240, respectively.

SYNTHESIS EXAMPLE 5

Synthesis of a vinyl copolymer (A-5) containing a hydrolyzable silyl group and an alcoholic hydroxyl group A similar procedure as in Synthesis Example 1 was carried out except that the mixture shown below was used as the mixture of copolymerizable compounds.

| | |
|---|---|
| Styrene | 15.0 parts |
| Methyl methacrylate | 0.4 part |
| n-Butyl acrylate | 22.5 parts |
| Placcel FA-1 (produced by DAICEL CHEMICAL INDUSTRIES, LTD.) | 42.1 parts |
| γ-Methacryloxypropyltrimethoxysilane | 20.0 parts |

The solids content of the obtained solution of a vinyl copolymer (A-5) containing a hydrolyzable silyl group and an alcoholic hydroxyl group was 60%. The number average molecular weight of the obtained vinyl copolymer (A-5) was 4300. The hydroxyl equivalent and the silyl equivalent of the vinyl copolymer (A-5) were 580 and 1240, respectively.

SYNTHESIS EXAMPLE 6

Synthesis of a vinyl copolymer (A-6) containing a hydrolyzable silyl group and an alcoholic hydroxyl group A reactor equipped with a stirrer, a thermometer, a reflux condenser, a nitrogen gas inlet tube and a dropping funnel was charged with 13.0 parts of "Solvesso 100" (a petrolic aromatic solvent, produced by Exxon Chemical Japan, Ltd.) and 13.0 parts of n-butyl alcohol, and the reactor was heated to 110° C. while introducing nitrogen gas. Subsequently, the mixture shown below was added dropwise to the reactor through the dropping funnel at a uniform rate over a period of 3 hours.

| | |
|---|---|
| Styrene | 15.0 parts |
| Methyl methacrylate | 8.3 parts |
| n-Butyl acrylate | 34.3 parts |
| 2-Hydroxypropyl acrylate | 22.4 parts |
| γ-Methacryloxypropyltrimethoxysilane | 20.0 parts |
| V-59 (produced by Wako Pure Chemical Industries, Ltd.) | 6.46 parts |
| Methyl orthoacetate | 2.0 parts |
| Solvesso 100 | 3.5 parts |
| Methanol | 2.0 parts |

After completing the addition of the mixture, 0.34 part of V-59, 5.0 parts of Solvesso 100, 2.0 parts of methyl orthoacetate and 10.0 parts of n-butyl alcohol were added dropwise to the reactor at a uniform rate over a period of 30 minutes. After carrying out polymerization for one and a half hours, the reactor was cooled, and then 4.0 parts of methyl orthoacetate and 4.0 parts of methanol were added thereto. Subsequently, Solvesso 100 was further added to adjust the solids content to 60%. As the product, a solution of a vinyl copolymer (A-6) containing a hydrolyzable silyl group and an alcoholic hydroxyl group was obtained.

The number average molecular weight of the obtained vinyl copolymer (A-6) was 4000. The hydroxyl equivalent and the silyl equivalent of the vinyl copolymer (A-6) were 580 and 1240, respectively.

SYNTHESIS EXAMPLE 7

Synthesis of a vinyl copolymer (A-7) containing a hydrolyzable silyl group and an alcoholic hydroxyl group A similar procedure as in Synthesis Example 1 was carried out except that the mixture shown below was used as the mixture of copolymerizable compounds.

| | |
|---|---|
| Styrene | 15.0 parts |
| Methyl methacrylate | 4.7 parts |
| n-Butyl acrylate | 20.3 parts |
| 2-Hydroxypropyl acrylate | 20.0 parts |
| γ-Methacryloxypropyltrimethoxysilane | 40.0 parts |

The solids content of the obtained solution of a vinyl copolymer (A-7) containing a hydrolyzable silyl group and an alcoholic hydroxyl group was 60%. The number average molecular weight of the obtained vinyl copolymer (A-7) was 4200. The hydroxyl equivalent and the silyl equivalent of the vinyl copolymer (A-7) were 650 and 620, respectively.

SYNTHESIS EXAMPLE 8

Synthesis of a vinyl copolymer (A-8) containing a hydrolyzable silyl group and an alcoholic hydroxyl group A similar procedure as in Synthesis Example 1 was carried out except that the mixture shown below was used as the mixture of copolymerizable compounds.

| | |
|---|---|
| Styrene | 15.0 parts |
| Methyl methacrylate | 7.8 parts |
| n-Butyl acrylate | 17.2 parts |
| 2-Hydroxypropyl acrylate | 30.0 parts |
| γ-Methacryloxypropyltrimethoxysilane | 30.0 parts |

The solids content of the obtained solution of a vinyl copolymer (A-8) containing a hydrolyzable silyl group and an alcoholic hydroxyl group was 60%. The number average molecular weight of the obtained vinyl copolymer (A-8) was 4300. The hydroxyl equivalent and the silyl equivalent of the vinyl copolymer (A-8) were 433 and 827, respectively.

SYNTHESIS EXAMPLE 9

Synthesis of a vinyl copolymer (A-9) containing a hydrolyzable silyl group and an alcoholic hydroxyl group A similar procedure as in Synthesis Example 1 was carried out except that the mixture shown below was used as the mixture of copolymerizable compounds.

| | |
|---|---|
| Styrene | 15.0 parts |
| Methyl methacrylate | 20.5 parts |
| n-Butyl acrylate | 31.5 parts |
| 2-Hydroxypropyl acrylate | 13.0 parts |
| γ-Methacryloxypropyltrimethoxysilane | 20.0 parts |

The solids content of the obtained solution of a vinyl copolymer (A-9) containing a hydrolyzable silyl group and an alcoholic hydroxyl group was 60%. The number average molecular weight of the obtained vinyl copolymer (A-9) was 4100. The hydroxyl equivalent and the silyl equivalent of the vinyl copolymer (A-9) were 1000 and 1240, respectively.

SYNTHESIS EXAMPLE 10

Synthesis of a vinyl copolymer (B-1) containing a hydrolyzable silyl group

A reactor equipped with a stirrer, a thermometer, a reflux condenser, a nitrogen gas inlet tube and a dropping funnel was charged with 17.1 parts of "Solvesso 100" (a petrolic aromatic solvent, produced by Exxon Chemical Japan, Ltd.), and the reactor was heated to 110° C. while introducing nitrogen gas. Subsequently, the mixture shown below was added dropwise to the reactor through the dropping funnel at a uniform rate over a period of 5 hours.

| | |
|---|---|
| Styrene | 13.2 parts |
| Methyl methacrylate | 4.8 parts |
| Isobutyl acrylate | 29.5 parts |
| γ-Methacryloxypropyltrimethoxysilane | 52.0 parts |
| Acrylamide | 0.5 part |
| V-59 (produced by Wako Pure Chemical Industries, Ltd.) | 4.56 parts |
| Methyl orthoacetate | 2.0 parts |
| Solvesso 100 | 8.0 parts |
| n-Butyl alcohol | 2.0 parts |
| Xylene | 9.3 parts |

After completing the addition of the mixture, 0.24 part of V-59, 5.4 parts of Solvesso 100, 6.0 parts of xylene and 2.0 parts of n-butyl alcohol were added dropwise to the reactor at a uniform rate over a period of 30 minutes. After carrying out polymerization for one and a half hours, the reactor was cooled, and then 4.0 parts of methyl orthoacetate and 2.0 parts of methanol were added thereto. Subsequently, Solvesso 100 was further added to the resin solution to adjust the solids content to 60%. As the product, a solution of a vinyl copolymer (B-1) containing a hydrolyzable silyl group was obtained.

The number average molecular weight of the obtained vinyl copolymer (B-1) was found to be 4000. The silyl equivalent of the vinyl copolymer (B-1) was 477.

COMPARATIVE SYNTHESIS EXAMPLE 1

Synthesis of a vinyl copolymer (C-1) containing a hydrolyzable silyl group

A similar procedure as in Synthesis Example 1 was carried out except that the mixture shown below was used as the mixture of copolymerizable compounds.

| | |
|---|---|
| Styrene | 18.0 parts |
| n-Butyl acrylate | 35.0 parts |
| γ-Methacryloxypropyltrimethoxysilane | 47.0 parts |

The solids content of the obtained solution of a vinyl, copolymer (C-1) containing a hydrolyzable silyl group was 60%. The number average molecular weight of the obtained vinyl copolymer (C-1) was 4300. The silyl equivalent of the vinyl copolymer (C-1) was 528.

COMPARATIVE SYNTHESIS EXAMPLE 22

Synthesis of an organic polyol-based copolymer (D-1)

A similar procedure as in Synthesis Example 1 was carried out except that the mixture shown below was used as the mixture of copolymerizable compounds.

| | |
|---|---|
| Styrene | 15.0 parts |
| Methyl methacrylate | 20.3 parts |
| n-Butyl acrylate | 31.4 parts |
| 2-Hydroxyethyl acrylate | 33.3 parts |

The solids content of the obtained solution of a polyol-based copolymer (D-1) was 60%. The number average molecular weight of the obtained polyol-based copolymer (D-1) was 4000. The hydroxyl equivalent of the polyol-based copolymer (D-1) was 348.

COMPARATIVE SYNTHESIS EXAMPLE 3

Synthesis of an organic polyol-based copolymer (D-2)

A similar procedure as in Synthesis Example 1 was carried out except that the mixture shown below was used as the mixture of copolymerizable compounds.

| | |
|---|---|
| Styrene | 15.0 parts |
| Methyl.methacrylate | 2.8 parts |
| n-Butyl acrylate | 44.9 parts |
| 2-Hydroxyethyl methacrylate | 37.3 parts |

The solids content of the obtained solution of a polyol-based copolymer (D-2) was 60%. The number average molecular weight of the obtained polyol-based copolymer (D-2) was 3800. The hydroxyl equivalent of the polyol-based copolymer (D-2) was 349.

COMPARATIVE SYNTHESIS EXAMPLE 4

Synthesis of a vinyl copolymer (E-1) containing a hydrolyzable silyl group and an alcoholic hydroxyl group A similar procedure as in Synthesis Example 1 was carried out except that the mixture shown below was used as the mixture of copolymerizable compounds.

| | |
|---|---|
| Methyl methacrylate | 10.0 parts |
| 2-Hydroxyethyl methacrylate | 80.0 parts |
| γ-Methacryloxypropyltrimethoxysilane | 10.0 parts |

The solids content of the obtained solution of a vinyl copolymer (E-1) containing a hydrolyzable silyl group and an alcoholic hydroxyl group was 60%. The number average molecular weight of the obtained vinyl copolymer (E-1) was 4500. The hydroxyl equivalent and the silyl equivalent of the vinyl copolymer (E-1) were 163 and 2480, respectively.

COMPARATIVE SYNTHESIS EXAMPLE 5

Synthesis of a vinyl copolymer (E-2) containing a hydrolyzable silyl group and an alcoholic hydroxyl group A similar procedure as in Synthesis Example 1 was carried out except that the mixture shown below was used as the mixture of copolymerizable compounds.

| | |
|---|---|
| Styrene | 15.0 parts |
| Methyl methacrylate | 27.8 parts |
| n-Butyl acrylate | 32.2 parts |
| 2-Hydroxypropyl acrylate | 5.0 parts |
| γ-Methacryloxypropyltrimethoxysilane | 20.0 parts |

The solids content of the obtained solution of a vinyl copolymer (E-2) containing a hydrolyzable silyl group and an alcoholic hydroxyl group was 60%. The number average molecular weight of the obtained vinyl copolymer (E-2) was 4000. The hydroxyl equivalent and the silyl equivalent of the vinyl copolymer (E-2) were 2600 and 1240, respectively.

The components used in the Synthesis Examples and the Comparative Synthesis Examples described above, and the physical properties of the products synthesized in the Examples are shown in Table 1.

TABLE 1

| | MW | A-1 | A-2 | A-3 | A-4 | A-5 | A-6 | A-7 |
|---|---|---|---|---|---|---|---|---|
| Styrene | 104 | 15 | 15 | 15 | 15 | 15 | 15 | 15 |
| Methyl methacrylate | 101 | 8.3 | 0.1 | 10.6 | 7.9 | 0.4 | 8.3 | 4.7 |
| n-Butyl acrylate | 129 | 34.3 | 42.5 | 34.4 | 18.0 | 22.5 | 34.3 | 20.3 |
| 2-Hydroxypropyl acrylate | 130 | 22.4 | | | | | 22.4 | 20 |
| γ-Methacryloxypropyltrimethoxysilane | 248 | 20 | 20 | 20 | 20 | 20 | 20 | 40 |
| 2-Hydroxyethyl methacrylate | 130 | | 22.4 | | | | | |
| 2-Hydroxyethyl acrylate | 116 | | | 20 | | | | |
| Placcel FA-1 | 244 | | | | 39.1 | 42.1 | | |
| Isobutyl acrylate | | | | | | | | |
| Acrylamide | | | | | | | | |
| Total amount | | 100 | 100 | 100 | 100 | 100 | 100 | 100 |
| Molecular weight | | 4000 | 3900 | 3900 | 4300 | 4300 | 4000 | 4200 |
| Hydroxyl equivalent (g/mol) | | 580 | 580 | 580 | 624 | 580 | 580 | 650 |
| Silyl equivalent (g/mol) | | 1240 | 1240 | 1240 | 1240 | 1240 | 1240 | 620 |
| OH/Si | | 2.14 | 2.14 | 2.14 | 1.99 | 2.14 | 2.14 | 0.95 |

| | A-8 | A-9 | B-1 | C-1 | D-1 | D-2 | E-1 | E-2 |
|---|---|---|---|---|---|---|---|---|
| Styrene | 15 | 15 | 13.2 | 18 | 15 | 15 | | 15 |
| Methyl methacrylate | 7.8 | 20.5 | 4.8 | | 20.3 | 2.8 | 10 | 27.8 |
| n-Butyl acrylate | 17.2 | 31.5 | | 35 | 31.4 | 44.9 | | 32.2 |
| 2-Hydroxypropyl acrylate | 30 | 13 | | | | | | 5 |
| γ-Methacryloxypropyltrimethoxysilane | 30 | 20 | 52 | 47 | | | 10 | 20 |
| 2-Hydroxyethyl methacrylate | | | | | | 37.3 | 80 | |
| 2-Hydroxyethyl acrylate | | | | | 33.3 | | | |
| Placcel FA-1 | | | | | | | | |
| Isobutyl acrylate | | 29.5 | | | | | | |
| Acrylamide | | | 0.5 | | | | | |
| Total amount | 100 | 100 | 100 | 100 | 100 | 100 | 100 | 100 |
| Molecular weight | 4300 | 4100 | 4000 | 4300 | 4000 | 3800 | 4500 | 4000 |
| Hydroxyl equivalent (g/mol) | 433 | 1000 | — | — | 348 | 349 | 163 | 2600 |
| Silyl equivalent (g/mol) | 827 | 1240 | 477 | 528 | — | — | 2480 | 1240 |
| OH/Si | 1.91 | 1.24 | 0 | 0 | — | — | 15.3 | 0.48 |

EXAMPLES 1 TO 9 AND COMPARATIVE EXAMPLES 1 TO 5

The copolymers prepared in Synthesis Examples 1 to 10 and the copolymers prepared in Comparative Synthesis Examples 1 to 5 were blended according to the blending ratios shown in Table 2. In the Examples 1 to 9 and in the Comparative Examples 1 to 4, a leveling agent (#1984-50; produced by Kusumoto Chemicals Ltd.) and a mixture of dodecylbenzenesulfonic acid/diisopropanolamine=1/1.03 (by equivalent ratio) as the curing catalyst of the component (C) were added to each of the blended copolymers in amounts of 0.4% and 2%, respectively, based on the total solids content. The resulting mixtures were each diluted with Solvesso 100 to adjust the viscosity (measured using a Ford cup) to 15 to 20 seconds. The obtained mixtures were each used as a clear paint for top coat.

A mild steel plate which had been previously defatted and phosphated was coated with an automobile epoxy amide cationic electrocoating primer and then with an intermediate coating surfacer to give a test piece. On this test piece, a high-solid type of acrylic melamine resin coating (black metallic base) was applied as a base coat. Subsequently, the clear paint for top coat described above was applied by means of a wet-on-wet coating, and after setting for 20 minutes, the resulting test piece was baked at 140° C. for 30 minutes. In the obtained dried film, the thickness of the base coat was about 15 μm and the thickness of the top clear coat was about 50 μm.

Various properties of the obtained coating films were evaluated according to the methods described below. The results are shown in Table 2

1) Gel Fraction

A free clear film obtained by baking at 140° C. for 30 minutes was wrapped with a 300-mesh stainless steel wire net which had been weighed accurately ($W_0$), and the weight of the whole was measured accurately ($W_1$). After extracting by soaking in acetone for 24 hours, the net with the film was dried and then weighed accurately ($W_2$). The gel fraction was determined according to the following equation:

$$\text{Gel fraction (\%)} = \frac{(W_2 - W_0)}{(W_1 - W_0)} \times 100$$

2) Water-resistant Gel Fraction Retention

A free clear film obtained by baking at 140° C. for 30 minutes was wrapped with a 300-mesh stainless steel wire net which had been weighed accurately ($W'_0$), and the weight of the whole was measured accurately ($W'_1$). After soaking in water at 80° C. for 24 hours, the net with the film was taken out, and was then soaked in acetone for 24 hours to extract. Subsequently, the net with the film was dried and weighed accurately ($W'_2$). The water-resistant gel fraction was determined according to the following equation:

$$\text{Water-resistant gel fraction (\%)} = \frac{(W'_2 - W'_0)}{(W'_1 - W'_0)} \times 100$$

In the same sample, by using the gel fraction value determined previously, the water-resistant gel fraction retention was determined according to the following equation:

$$\text{Water-resistant gel fraction retention (\%)} = \frac{(\text{water-resistant gel fraction})}{(\text{gel fraction})} \times 100$$

3) Acid Resistance

A test panel was spotted with 4 drops of 10% sulfuric acid aqueous solution using a pipette, and then was heated at 70° C. for 30 minutes in a drying oven. After washing off the sulfuric acid aqueous solution with water, the test panel was observed for changes in its coating film surface. The degree of change in the surface was evaluated according to the following scale:

10 points: no change observed compared to the condition before spotting;
9 points: slight change observed;
8 points: circular traces remain;
7 points: slight color-change or blisters observed;
6 points: slight lowering of gloss or color-change observed;
5 points: lowering of gloss or color-change clearly observed;
4 points: slight shrinking or clear blisters observed;
3 points: slight rifting, strong shrinking or color-change observed;
2 points: rifting clearly observed; and
1 point: dissolving of film observed.

4) Scratch Resistance

A test piece was fixed horizontally and an abrasive agent (a mixture of 1.2% of Dust for Industrial Testing-No. 8 provided by Japan Association of Powder Process Industry & Engineering, 1.2% of Dust for Industrial Testing No. 11 provided by the same as above, 0.6% of kaolin, 1.0% of a neutral detergent and 96.0% of water) was coated thereon. Subsequently, a weight covered with kraft paper (contact surface diameter=5 cm, load weight=22 g/cm$^2$) was stroked against the surface of the coating film. Each 20° gloss was measured using a gloss meter before stroking and after 20 strokes. The scratch resistance was evaluated according to the gloss retention (GR). A larger GR value means better scratch resistance.

TABLE 2

| Example No. | 1 | 2 | 3 | 4 | 5 | 6 | 7 | 8 | 9 |
|---|---|---|---|---|---|---|---|---|---|
| [Composition of clear paint for top coat (parts)] | | | | | | | | | |
| A-1 | 80 | | | | | | | | |
| A-2 | | 80 | | | | | | | |
| A-3 | | | 80 | | | | | | |
| A-4 | | | | 80 | | | | | |
| A-5 | | | | | 80 | | | | |
| A-6 | | | | | | 80 | | | |
| A-7 | | | | | | | 80 | | |
| A-8 | | | | | | | | 70 | |
| A-9 | | | | | | | | | 80 |
| B-1 | 20 | 20 | 20 | 20 | 20 | 20 | 20 | 30 | 20 |
| OH/Si | 1.29 | 1.29 | 1.29 | 1.20 | 1.29 | 1.29 | 0.72 | 1.09 | 0.75 |
| [Evaluation results] | | | | | | | | | |
| Gel fraction (%) | 97 | 97 | 97 | 98 | 98 | 97 | 98 | 98 | 94 |
| Water-resistant gel fraction retention (%) | 97 | 95 | 95 | 92 | 91 | 96 | 97 | 98 | 96 |
| Acid resistance | 8 | 7 | 7 | 6 | 6 | 8 | 8 | 9 | 8 |
| Scratch resistance | 70 | 69 | 73 | 76 | 78 | 71 | 69 | 70 | 72 |

| Comparative Example No. | 1 | 2 | 3 | 4 | 5 |
|---|---|---|---|---|---|
| [Composition of clear paint for top coat (parts)] | | | | | |
| B-1 | | | | 20 | 20 |

TABLE 2-continued

| | | | | | |
|---|---|---|---|---|---|
| C-1 | 50 | 50 | | | |
| D-1 | 50 | | | | |
| D-2 | | 50 | | | |
| E-1 | | | 80 | | |
| E-2 | | | | 80 | |
| Commercially available acrylic melamine | | | | | 100 |
| OH/Si | 1.51 | 1.47 | 6.6 | 0.29 | — |
| [Evaluation results] | | | | | |
| Gel fraction (%) | 95 | 96 | 88 | 90 | 98 |
| Water-resistant gel fraction retention (%) | 41 | 55 | 82 | 94 | 90 |
| Acid resistance | 3 | 3 | 4 | 7 | 1 |
| Scratch resistance | 68 | 66 | 62 | 52 | 70 |

(Note)
In the tables, each part(s) is based on the total weight of solid matter.

As seen in Table 2, it is found that the blend systems of a vinyl copolymer having a hydrolyzable silyl group and an alcoholic hydroxyl group with a vinyl copolymer having a hydrolyzable silyl group have superior water resistance, acid resistance and scratch resistance compared to the blend systems of a vinyl copolymer having a hydrolyzable silyl group with an acrylic polyol.

As explained above, the curable composition for paint of the present invention exhibits well-balanced properties of good acid resistance, water resistance, scratch resistance, weathering resistance, and so forth, and therefore can be suitably used for top coatings, for example, of automobiles, industrial machines, steel furniture, outer walls of buildings, household electric appliances, plastics, and the like.

What is claimed is:
1. A curable composition for paint comprising:
   (A) 95 to 5 parts by weight of a first vinyl copolymer having a main chain and at least one hydrolyzable silyl group represented by the formula (I):

wherein $R^1$ is an alkyl group having from 1 to 10 carbon atoms; $R^2$ is one of a hydrogen atom and a monovalent hydrocarbon group selected from the group consisting of an alkyl group, an aryl group and an aralkyl group each having from 1 to 10 carbon atoms; and a is 0, 1 or 2, said at least one hydrolyzable silyl group of the first vinyl copolymer being located at least at one of an end of the main chain and in a side chain thereof, and having at least one alcoholic hydroxyl group at least at one of an end of the main chain and in a side chain thereof, wherein the main chain of the first vinyl copolymer comprises substantially a vinyl copolymer chain and the alcoholic hydroxyl equivalent is from 180 to 2000 g/mol;
   (B) 5 to 95 parts by weight of a second vinyl copolymer having a main chain and at least one hydrolyzable silyl group represented by the formula (II):

wherein $R^3$ is an alkyl group having from 1 to 10 carbon atoms; $R^4$ is one of a hydrogen atom and a monovalent hydrocarbon group selected from the group consisting of an alkyl group, an aryl group and an aralkyl group each having from 1 to 10 carbon atoms; and b is 0, 1 or 2, said at least one hydrolyzable silyl group of the second vinyl copolymer being located at least at one of an end of the main chain and in a side chain thereof, and the second vinyl copolymer having no alcoholic hydroxyl group, wherein the main chain of the second vinyl copolymer comprises substantially a vinyl copolymer chain; and
   (C) 0.001 to 10 parts by weight of a curing catalyst per 100 parts by weight of the components (A) and (B) in total.

2. The curable composition of claim 1 wherein the hydrolyzable silyl equivalent of the vinyl copolymer of the component (A) is from 380 to 30000 g/mol.

3. The curable composition of claim 1 wherein the ratio of the number of alcoholic hydroxyl groups/the number of hydrolyzable silyl groups in the vinyl copolymer of the component (A) is from 0.1/1 to 3.0/1.

4. The curable composition of claim 1 wherein the vinyl copolymer of the component (A) is a vinyl copolymer using 2-hydroxypropyl (meth)acrylate which is an alcoholic hydroxyl group-containing vinyl copolymer as a copolymerization component.

* * * * *